US012650862B2

(12) United States Patent
Harshith

(10) Patent No.: US 12,650,862 B2
(45) Date of Patent: Jun. 9, 2026

(54) SHARING VIRTUAL ENVIRONMENT DATA

(71) Applicant: Citrix Systems, Inc., Fort Lauderdale, FL (US)

(72) Inventor: Katta Rajasekhar Sreenivas Harshith, Andhra Pradesh (IN)

( * ) Notice: Subject to any disclaimer, the term of this patent is extended or adjusted under 35 U.S.C. 154(b) by 722 days.

(21) Appl. No.: 17/462,163

(22) Filed: Aug. 31, 2021

(65) Prior Publication Data
US 2023/0064996 A1     Mar. 2, 2023

(51) Int. Cl.
| | |
|---|---|
| *G06F 9/451* | (2018.01) |
| *G06F 9/455* | (2018.01) |
| *G06F 16/955* | (2019.01) |
| *G06F 21/62* | (2013.01) |
| *H04L 51/212* | (2022.01) |

(52) U.S. Cl.
CPC .......... *G06F 9/452* (2018.02); *G06F 9/45558* (2013.01); *G06F 16/955* (2019.01); *G06F 21/62* (2013.01); *H04L 51/212* (2022.05); *G06F 2009/45587* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2014/0108506 A1 | 4/2014 | Borzycki et al. | |
| 2014/0108538 A1 | 4/2014 | Borzycki et al. | |
| 2015/0371057 A1* | 12/2015 | Ow ..................... | H04L 63/0815 726/28 |
| 2016/0234291 A1* | 8/2016 | Fang ........................ | H04L 51/08 |
| 2017/0149853 A1* | 5/2017 | Furuichi ............... | H04L 65/403 |
| 2020/0226101 A1* | 7/2020 | Dhanabalan ........ | G06F 9/45558 |
| 2021/0173960 A1 | 6/2021 | Dao et al. | |

* cited by examiner

*Primary Examiner* — Bradley A Teets
*Assistant Examiner* — Melissa A Headly

(57) ABSTRACT

A virtual environment (e.g., a virtual desktop or virtual application) may be configured to provide an option to share data that exists within the virtual environment. Upon selecting the option, a device that implements the virtual environment (e.g., a virtualization server) may send a sharing command to a client device that is accessing the virtual environment. The client device may receive the sharing command and detect one or more sharing mechanisms available via the client device (e.g., installed applications with a functionality for sharing data). The client device may then provide a list of sharing mechanisms to a user and receive a user selection of a sharing mechanism. The client device may then share the data with another device using the sharing mechanism selected by the user.

18 Claims, 9 Drawing Sheets

SHARING VIRTUAL ENVIRONMENT DATA

FIELD

Aspects described herein generally relate to virtualization, enterprise mobility management, enterprise data security, and hardware and software related thereto. More specifically, one or more aspects describe herein provide mechanisms for efficiently and securely sharing data that exists within a virtual environment.

BACKGROUND

User devices and other devices commonly access virtual desktops and/or virtual applications. In doing so, the devices may generate, view, edit, and/or otherwise interact with data that exists within a virtual environment. Sometimes users wish to share such data with another device, but may be limited by the tools that are provided within the virtual environment. As a result, users often fall back on inefficient and potentially insecure sharing mechanisms, such as by sending emails to themselves that attach the data they wish to share, so that they may interact with the data at another device.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards mechanisms for efficiently and securely sharing data that exists within a virtual environment using tools that are provided by another device, such as a mobile phone, laptop computer, or other user client device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards providing efficient and secure mechanisms for sharing data that exists within a virtual environment using tools that are installed on or otherwise provided by another device. For example, a virtual environment (e.g., a virtual desktop or virtual application) may be configured to provide an option to share data that exists within the virtual environment. Upon selecting the option, a device that implements the virtual environment (e.g., a virtualization server) may send a sharing command to a device that is accessing the virtual environment (e.g., a user device and/or enterprise client device remotely accessing a session provided by the virtualization server). The client device may receive the sharing command and detect one or more sharing mechanisms available via the client device (e.g., installed applications with a functionality for sharing data). The client device may then provide a list of sharing mechanisms to a user and receive a user selection of a sharing mechanism, and/or may automatically select one or more sharing mechanisms for the user. The client device may then share the data with another device using the sharing mechanism(s) selected by the user.

Figure 1:
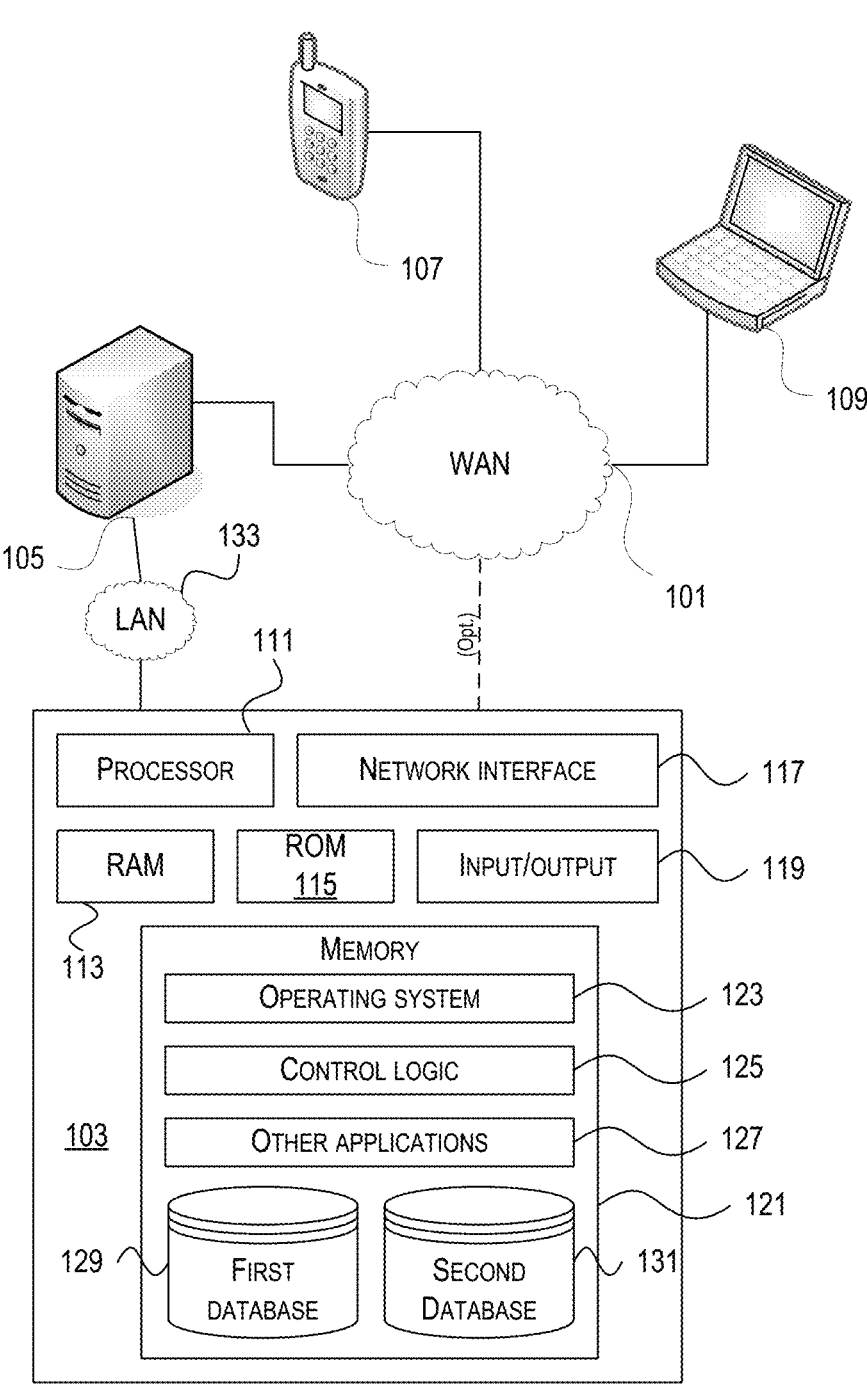
FIG. 1 depicts an illustrative computer system architecture that may be used in accordance with one or more illustrative aspects described herein.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.
Computing Architecture Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
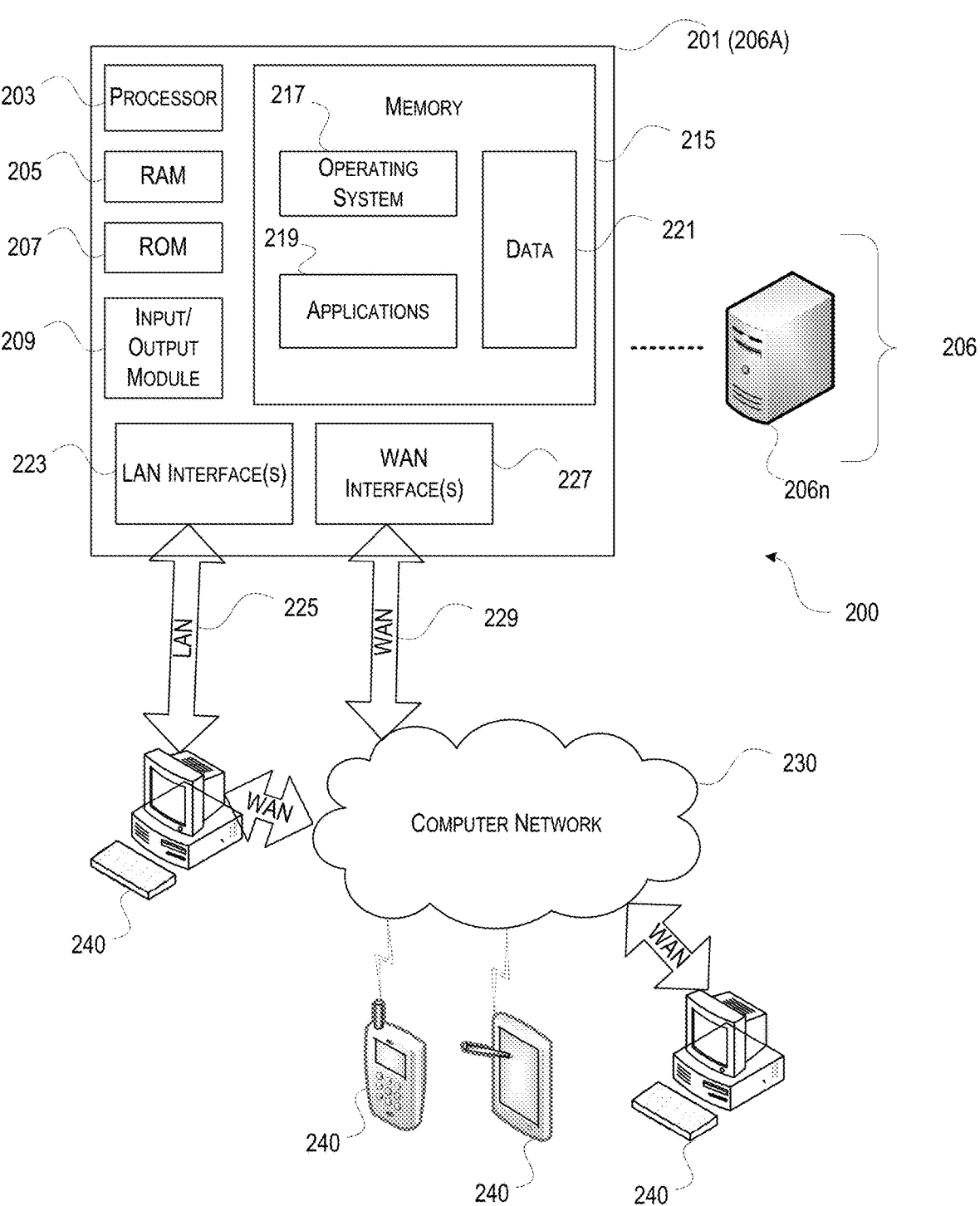
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
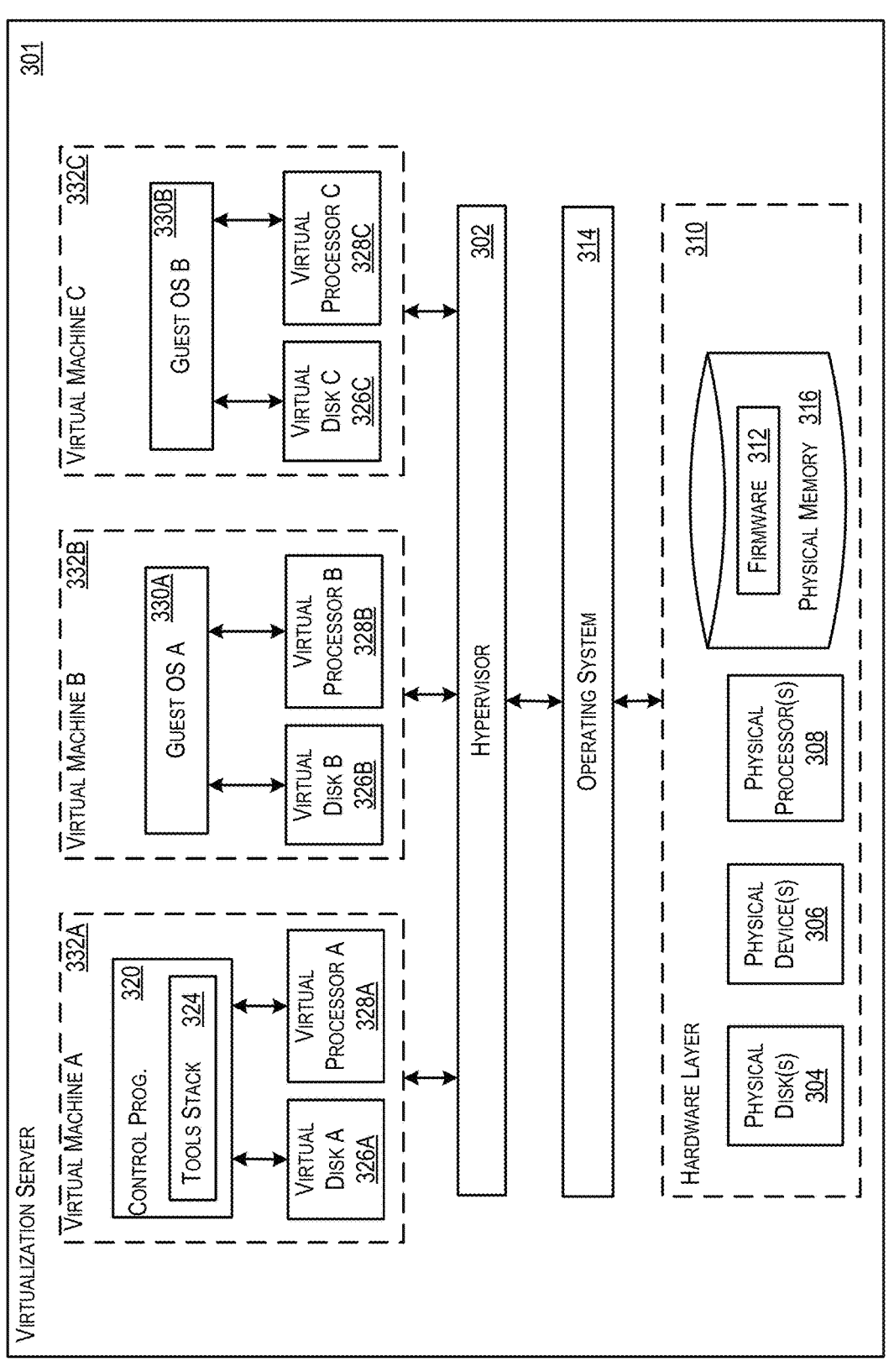
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, Virtual-Server or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
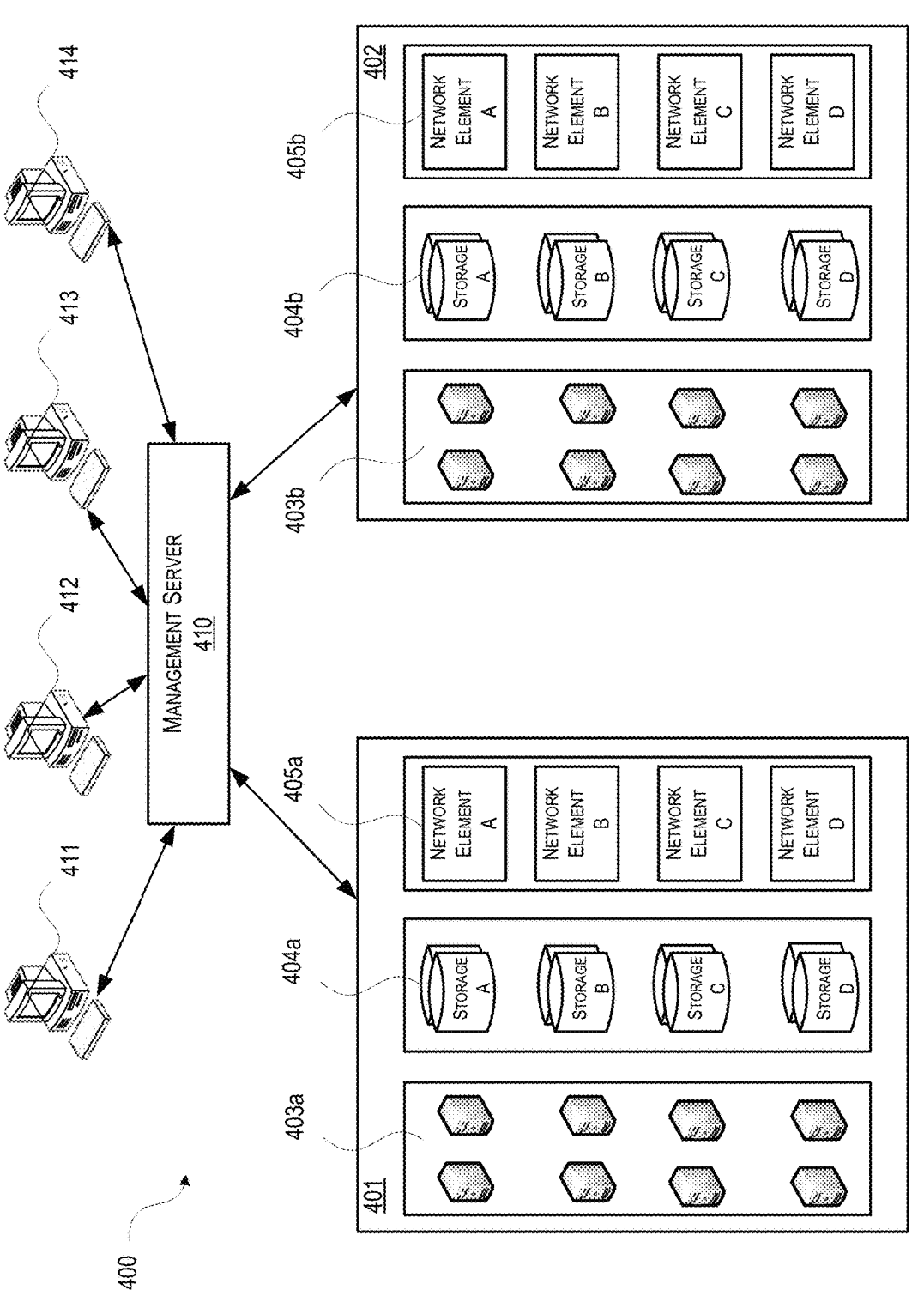
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Enterprise Mobility Management Architecture

Figure 5:
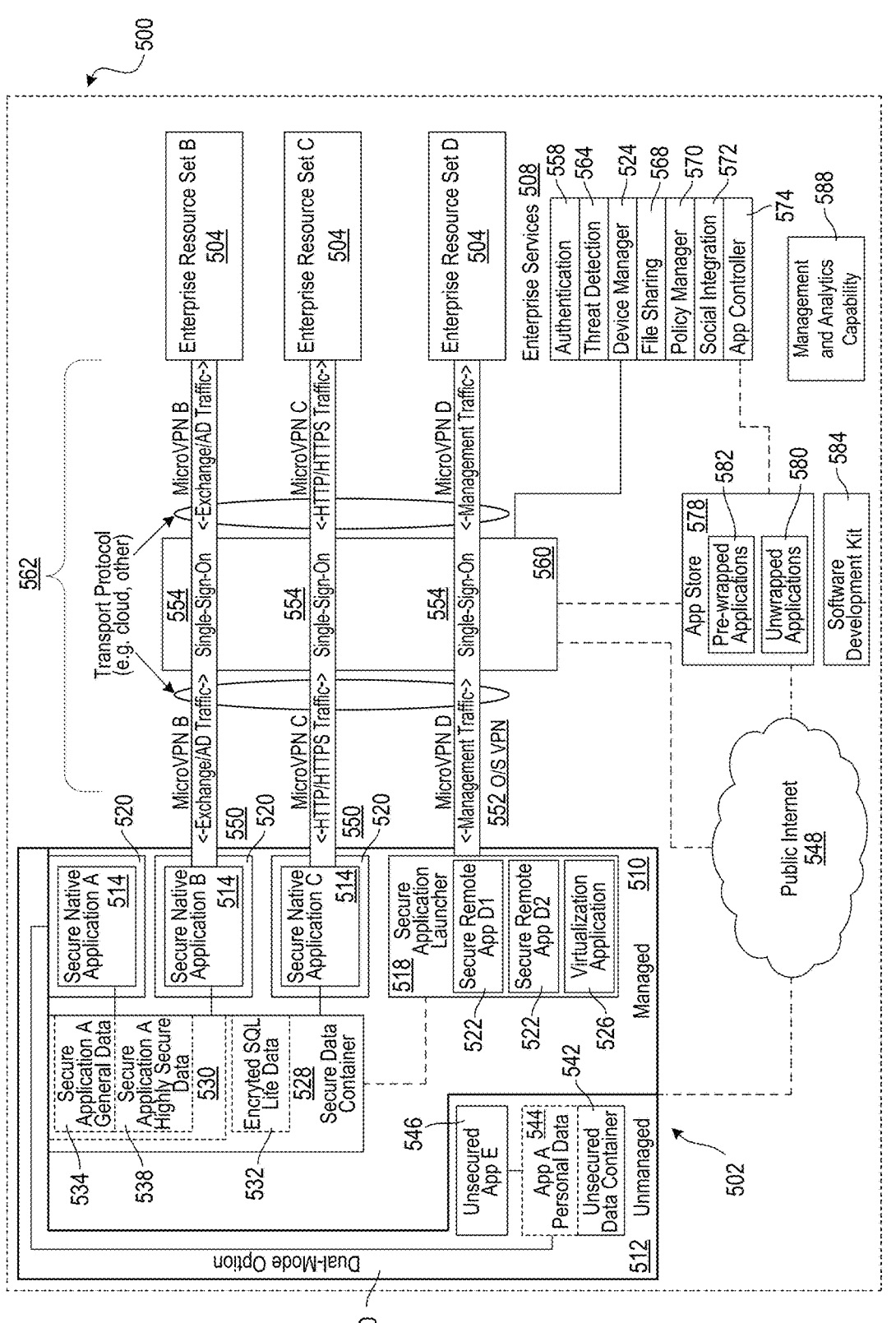
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
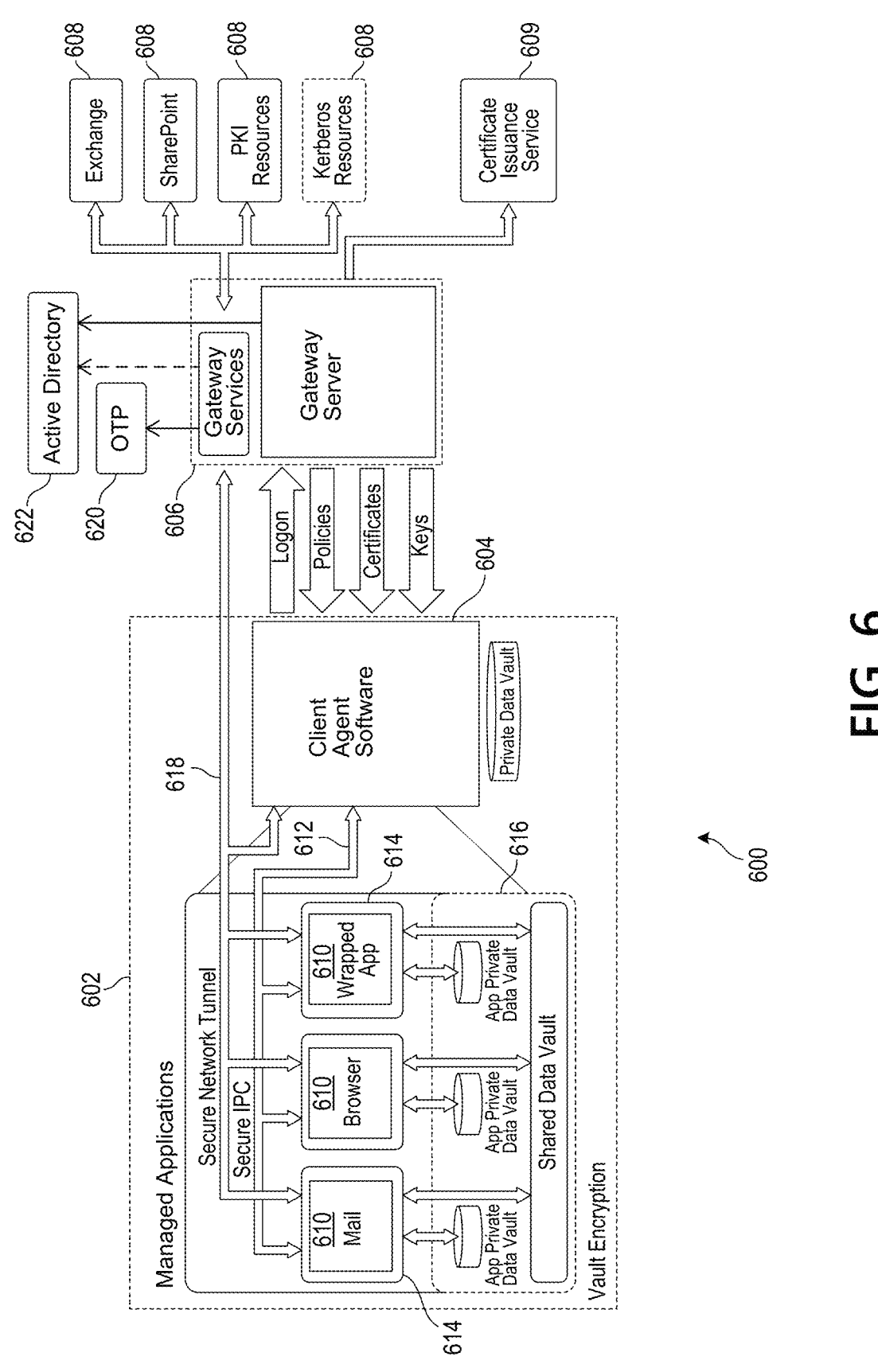
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Sharing Virtual Environment Data

Figure 7:
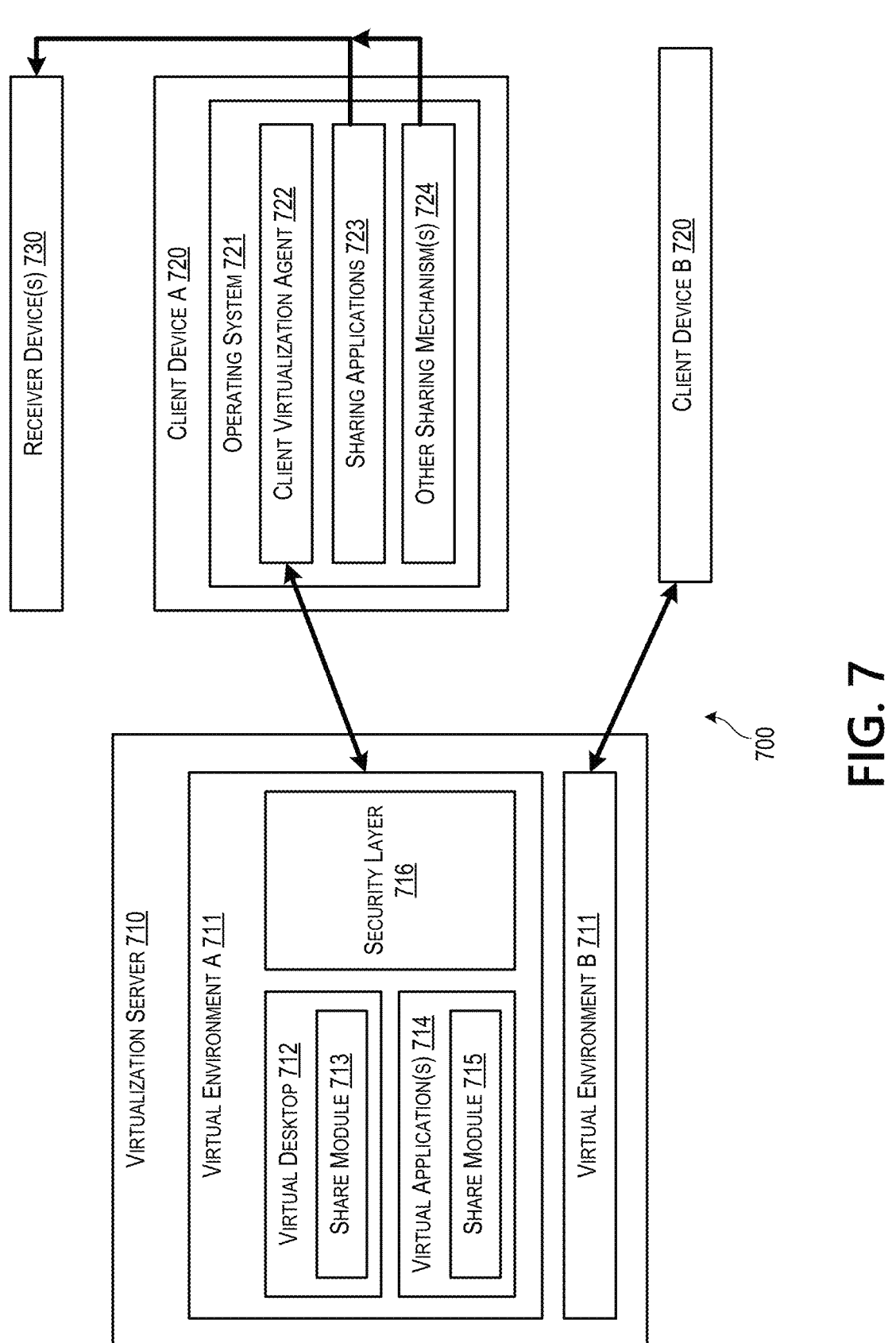
FIG. 7 depicts an illustrative system for implementing one or more illustrative aspects discussed herein.

FIG. 7 depicts an illustrative system for implementing one or more illustrative aspects discussed herein. The system includes a virtualization server 710 that may host one or more virtual environments 711, one or more client devices 720 that may access the virtual environments hosted by the virtualization server 710, and one or more receiver device(s) 730 that may communicate with one of the client devices 720 and receive shared content.

The virtualization server 710 may be configured to provide features as described above in connection with any of the preceding figures. For example, the virtualization server 710 may implement (e.g., using the virtual environment 711 or otherwise) the data server 103 and/or web server 105 of FIG. 1, the computing device 201 (206A) of FIG. 2, the virtualization server 301 of FIG. 3, the host server 403 and/or management server 410 of FIG. 4, and/or the enterprise resources 504, 608 and/or enterprise services 508, 609 of FIGS. 5 and 6. Similarly, the virtual environment 711 may be and/or include a virtual machine 332 as described above with respect to FIG. 3, for example.

Each virtual environment 711 may include a virtual desktop 712 (e.g., a virtual machine implementing a WINDOWS environment or some other desktop environment) and/or one or more virtual application(s) 714. The virtual application(s) 714 may be embedded within the virtual desktop 712 (e.g., a client device may open and interact with the application via the virtual desktop) and/or standalone applications as described above. Each virtual environment 711 may also contain a security layer 716 that may limit sharing of virtual environment content outside of a virtual environment 711, among other features, as described in detail below. In some cases, the security layer 716 may be implemented within the virtual desktop 712 (e.g., the security layer may be an application running within the virtual desktop 712, a component of an operating system provided by the virtual desktop 712, or the like). The virtual desktop 712 and/or virtual application(s) 714 may each include a share module 713, 715 that configures the corresponding virtual desktop 712 and/or virtual application 714 with a share function that is used to share virtual environment content outside the virtual environment, as described in further detail below.

The client devices 720 and/or the receiver device(s) 730 may implement and/or be any of the relevant devices of the preceding figures, such as the client computers 107, 109 of FIG. 1, the terminals 240 of FIG. 2, the clients 411-414 of FIG. 4, and/or the mobile devices 502, 602 of FIGS. 5 and 6. As shown in FIG. 7, the client device 720 may include a client virtualization agent 722, which may be and/or include the virtualization application 526 of FIG. 5, the client agent 604 of FIG. 6, or the like. The sharing application(s) 723 may be any application capable of sharing content with another device. For example, the sharing application(s) 723 may include email, text messaging, and/or other communications applications, which may be capable of sharing textual, image, and/or other types of content with other devices. Other types of application(s) may also have sharing functionality and thus may be included within the sharing application(s) 723; for example, a photo application may have functionality for sharing photos with other devices. The sharing application(s) 723 may each correspond to one or more of the secure applications 522, remote applications 522, unsecure applications 546, mail application 610, browser application 610, and/or wrapped application 610 of FIGS. 5 and 6.

As shown in FIG. 7, a particular client device 720 (e.g., client device A) may be connected to a particular virtual environment 711 (e.g., virtual environment A). Similarly, a second client device 720 (e.g., client device B) may be connected to a second virtual environment 711 (e.g., virtual environment B). Although additional virtual environments and client devices are not illustrated, more virtual environments and/or client devices may be implemented and/or served by one or more virtualization server(s) 710. Additionally or alternatively, as described above, a single client device may connect to multiple virtual environments and/or a particular virtual environment may be provided to multiple client devices.

Each client device 720 may store and/or run applications such as a client virtualization agent 722 and one or more sharing applications 723. Additionally or alternatively, functions ascribed to these applications may be executed by built-in features of the client device operating system 721. A sharing application 723 may include any application that provides functionality for sharing content with another device. For example, messaging applications allow sharing text and/or other content (e.g., images, videos, files) with friends and other contacts, mail applications allow sharing text and other content (e.g., as mail attachments), photo applications allow sharing photo albums and other content with other users, social media applications allow posting of content to a social network where it may be accessed by contacts, and the like. Each of these applications, and other similar applications, are thus sharing applications 723. Different client devices 720 may have different applications installed, and thus may have different sharing mechanisms available to a user.

The sharing applications 723 may be secure applications, such as secure native applications 514, secure remote applications 522 executed by a secure application launcher 518, virtualization applications 526 executed by a secure application launcher 518, and the like, as discussed above in connection with FIG. 5. Similarly, the client device 720 may use a secure application wrapper 520 to manage the applications and data stored by the applications as discussed in connection with FIG. 5.

Additionally, the operating system 721 may also include other sharing mechanisms 724 beyond any sharing mechanisms provided by the sharing applications 723. These other sharing mechanisms may be features that are built into the operating system 721, such as a BLUETOOTH sharing feature for sending content to a nearby device, or other such features. The sharing applications 723 and/or other sharing mechanisms 724 may be used to send content to one or more receiver devices 730 (e.g., by sharing content with a receiver device 730), as shown in FIG. 7 and as described in detail below.

The client device 720 may include a managed partition 510 and an unmanaged partition 512, as discussed above in connection with FIG. 5. In some cases, virtual environment data that is temporarily stored at the client device 720 may be stored in a managed partition, which may allow control of the data (e.g., a length of time the data is stored, as specified by policies discussed in further detail below). Thus, data that exists within a virtual environment may be temporarily shared with and stored at the client device 720 while still providing some measure of control over the data.

Figure 8A:
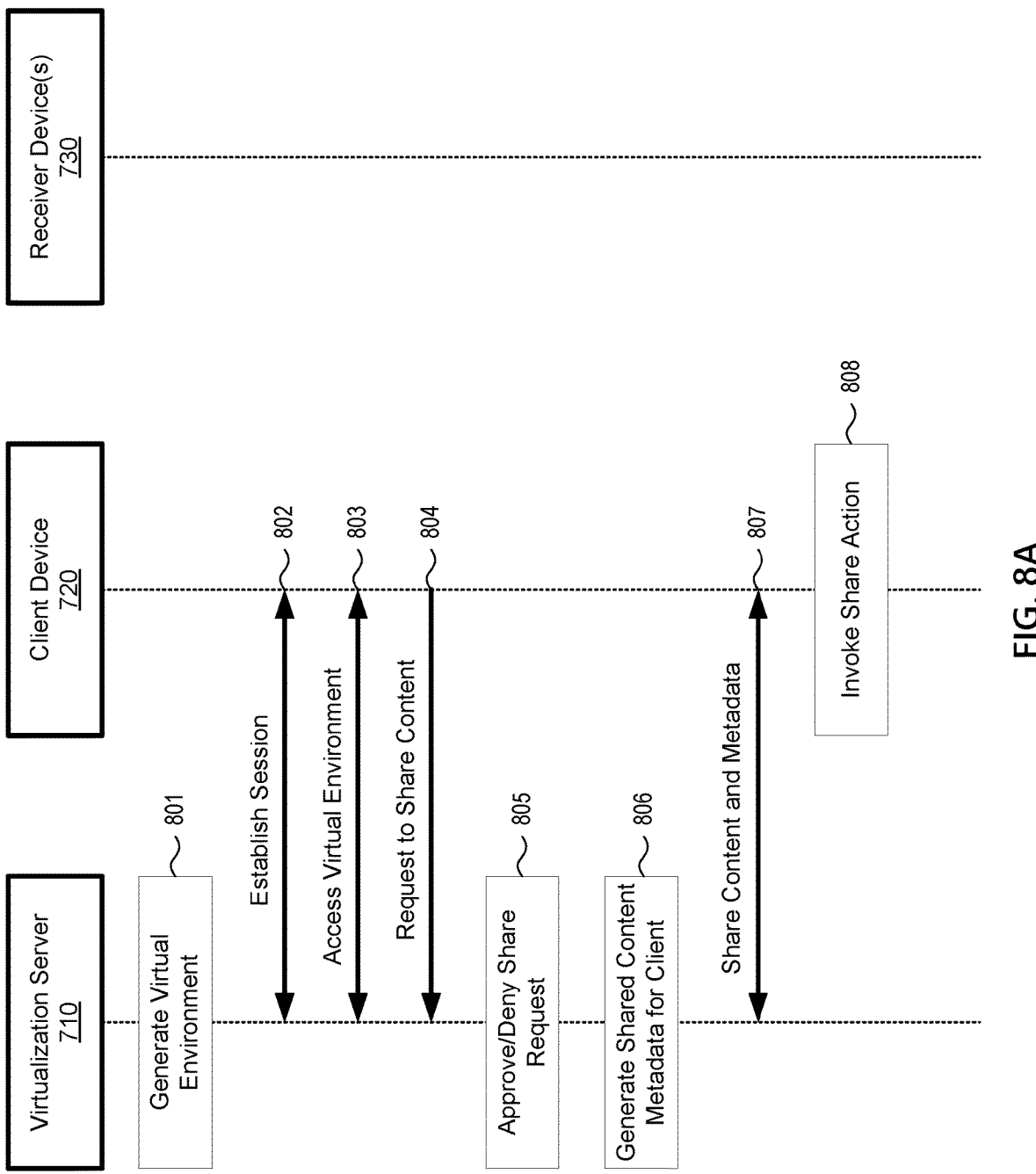
FIGS. 8A-8B depict a flow chart illustrating an algorithm for sharing data outside of a virtual environment.
Figure 8B:
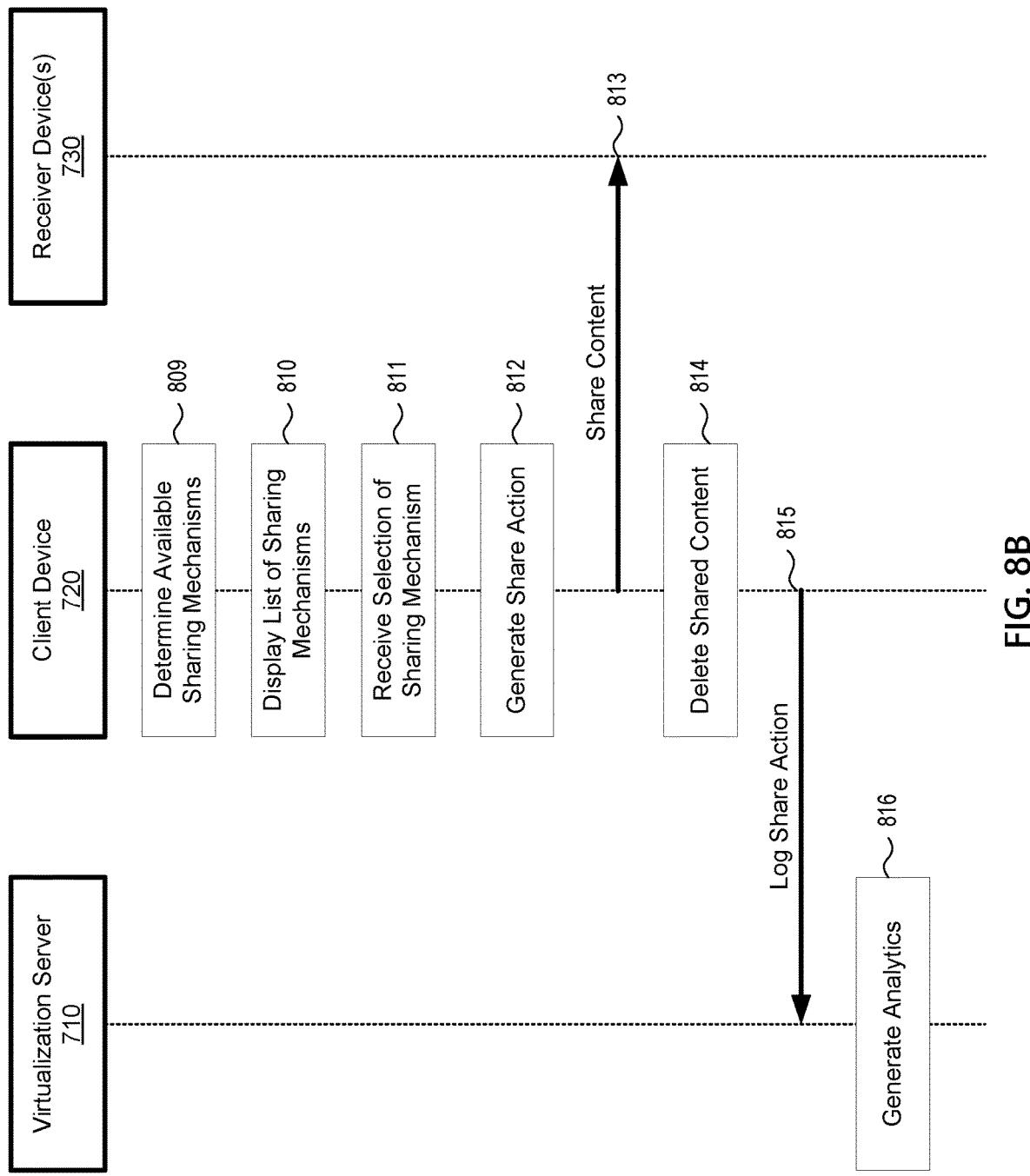

FIGS. 8A-B depict a flow chart illustrating an algorithm for sharing data outside of a virtual environment. The algorithm may be executed by a first device providing a virtual environment 711 (e.g., a virtualization server 710 as shown in FIGS. 8A-B) together with a second device accessing the virtual environment 711 (e.g., a client device 720 as shown in FIGS. 8A-B). Some or all of the steps attributed to the virtualization server 710 may be carried out by the virtual environment 711 of the virtualization server 710.

A user accessing the virtual environment via the second device may wish to share content that exists within the virtual environment using a sharing mechanism provided by the second device. For example, if the user is accessing the virtual environment using their smartphone, the user may wish to use an app installed on the smartphone (e.g., a messaging app) to share content with a friend or colleague. However, content that exists within the virtual environment (which may be hosted by the first device) may not be shareable using apps installed on the second device. The algorithm of FIGS. 8A-B provides a technological solution to this and similar problems.

In step 801, the virtualization server 710 may generate a virtual environment 711. The virtual environment 711 may comprise a virtual desktop 712 and/or a virtual application 714, as discussed above in connection with FIG. 7. For example, a hypervisor 302 may create the virtual environment using one or more of the unsecure virtual machines 332 and/or secure virtual machines 332 as discussed above in connection with FIG. 3. Additionally or alternatively, the virtualization server 710 may create the virtual desktop 712 and/or a virtual application 714 using any of the processes for creating virtual resources that are described in FIGS. 4-6 above. Furthermore, the virtualization server 710 may create the security layer 716 using any of the processes and/or components for securing resources and implementing security policies, as described above. The security layer 716 may be implemented within the virtual environment 711 created by the virtualization server 710.

At step 802, the client device 720 may log into or otherwise establish a session with the virtual environment 711 of the virtualization server 710. In some cases, the client device 720 may use the client virtualization agent 722 to log into or establish a session with the virtual environment 711 of the virtualization server 710. A user of the client device 720 may cause the client device 720 to connect to the virtual environment 711 of the virtualization server 710. The client device 720 may provide credentials that are stored and/or entered by a user to the virtual environment 711 of the virtualization server 710 as part of establishing the session. The client device 720 and the virtual environment 711 of the virtualization server 710 may also exchange encryption information and exchange other information as part of the session establishment.

At step 803, the client device 720 may access the virtual environment 711 hosted by the virtualization server 710. For example, the client device 720 may provide commands to interact with a virtual application and/or virtual desktop provided by the virtual environment 711, and the client device 720 may receive information for displaying the virtual application and/or desktop on a display of the client device 720. A user may thus interact with content, which includes any type of data (e.g., video, audio, image, text, a web page, or any other type of content) via the virtual environment. In one example, the client device 720 may access a virtualized browser application (e.g., either a stand-alone virtual application or within a virtual desktop) within the virtual environment 711 to access web content. Additionally or alternatively, the client device 720 may access a virtualized email application in the virtual environment 711 to access email. Additionally or alternatively, the client device 720 may access a virtualized file browser application in the virtual environment 711 to interact with files stored on a virtual disk, or may perform any other type of data interaction.

At step 804, the client device 720 may send a request to share particular content that exists within the virtual environment 711, which may be received by the virtualization server 710. A user of the client device 720 may indicate a desire to share content in different ways, which may vary based on the type of virtual desktop 712 and/or virtual application 714 that the user is interacting with in the virtual environment 711. For example, if the virtual environment 711 includes a WINDOWS Desktop, the virtual WINDOWS Desktop may be configured (e.g., by a share module 713 acting as a plugin or other installable software to modify the WINDOWS desktop) to display a "Share" selection in a right-click menu when a user right clicks on content, such as a file or other content. Other virtual desktops may also be configured (e.g., using a share module 713 that is compatible with the virtual desktop) so that selecting content using a right-click (and/or command-click or other types of keyboard and/or mouse shortcuts) may cause display of a "Share" option for sharing the selected content. A virtual application 714 may also be configured with a share module 715 acting as an extension, plugin, or other module that modifies the behavior of the application to allow selection of a "Share" option. For example, a virtual browser application 714 may have an installed share module 715 plugin that causes a "share" option to be displayed when a user right-clicks an image, a selection of text, or any other content displayed within a browser.

After a user of the client device 720 requests to share content that exists within the virtual environment 711, at step 805 the virtualization server 710 (e.g., using the security layer 716) may check permissions and/or security policies in order to determine whether to permit the requested sharing of content outside the virtual environment. In some cases, users should be prevented from sharing certain content outside a particular virtual environment 711. For example, if the virtual environment 711 is a secure corporate environment that allows access to confidential data, a request to share the confidential data outside of the corporate virtual environment should be denied.

Thus, as shown in FIG. 7, the virtualization server 710 (and/or the virtual environment 711) may implement a security layer 716 that controls permissions and/or policies for sharing content. The security layer 716 may access a set of permissions associated with the content that is requested to be shared to determine whether to permit sharing of the requested content. For example, an operating system running inside the virtual desktop 712 and/or underneath the virtual application(s) 714 may maintain permission flags for each file stored on the operating system, such as a read permission, a write permission, an execute permission, and/or other types of permissions. In some cases, the security layer 716 may configure the operating system to also store, for some or all files or other pieces of content, a share permission flag. The security layer 716 may check one or more of the permission flags (e.g., the share permission flag if it exists, the read permission, etc.) and use one or more rules to determine if sharing is permitted based on the one or more permissions. In one specific example, the security layer 716 may check if a sharing permission flag is set to allow sharing; if the sharing permissions is set to allow the sharing, the security layer 716 may approve the sharing request; if not, the sharing request may be denied. In addition to or as an alternative to using permission flags associated with individual files or other items of content, the security layer 716 may use one or more policy rules to approve or deny the sharing request. For example, a first policy rule may allow sharing of certain types of content, such as images, videos, or the like, while blocking sharing of other types of content (e.g., spreadsheets). A second policy rule may allow sharing of files or other content stored in various locations, such as certain folders, certain logical or physical drives, etc. A third policy rule may allow sharing of files or other content associated with certain metadata, (e.g., files that contain a certain string in the filename, files that were created and/or modified more recently than a particular date), while blocking sharing of files or other content associated with other metadata (e.g., files with older creation dates may be shared). A fourth policy rule may specify whether files or other content may be temporarily cached (and/or a length of time that the files may be temporarily cached) or otherwise stored at the client device 720 in order to allow for more efficient sharing of content via the client device 720. The security layer 716 may use one or more of these or other example rules in addition to or as an alternative to content-based permissions to approve or deny the share request, to set certain parameters for the share request (e.g., a length of time that the content may be temporarily stored at the client device 720), and the like. If the virtualization server 710 approves the share request, the process may proceed to step 806. If the share request is denied, the process of FIGS. 8A-B may terminate.

At step 806, the virtual environment 711 of the virtualization server 710 may generate shared content metadata to be sent to the client device 720. For example, the virtual environment 711 of the virtualization server 710 may, in some cases, generate a uniform resource identifier (URI) to be sent to the client device 720, that the client device 720 may use to access the content to be shared. Additionally and/or alternatively, the virtual environment 711 of the virtualization server 710 may generate any metadata that may be sent to the client device 720. For example, the metadata may include data describing the type of content to be shared, any policies for sharing the content (e.g., whether the content should be immediately deleted or not), and the like.

Although sharing functionality may vary across different client platforms (e.g., depending on the operating system 721 running on the client device 720), in some cases the generated shared content metadata may be identical regardless of the operating system 721 on the client device 720, and the client virtualization agent 722 may be configured to handle any client-specific requirements. Thus, the virtual environment 711 of the virtualization server 710 may embed metadata that causes the client virtualization agent 722 to share the content via any sharing applications 723 and/or other sharing mechanisms 724 that the client device 720 determines are installed or otherwise available on the client device 720, and the client virtualization agent 722 may be responsible for determining which sharing application 723 and/or other sharing mechanisms 724 are available on the client device 720, for causing the content to be shared using various frameworks or functionalities provided by the operating system 721, and/or the like.

Additionally or alternatively, the virtual environment 711 of the virtualization server 710 may also send, as part of the share content metadata, metadata that may set limits for the client virtualization agent 722 in causing the content to be shared. For example, the security layer 716 of the virtualization server 710 may specify that content may only be shared via a limited subset of the sharing applications 723 and/or other sharing mechanisms 724. In a specific example, data may only be allowed to be shared via a specific list of approved sharing applications 723, such as MICROSOFT OUTLOOK, an approved chat application, and other such applications. Thus, metadata may be generated that includes the limited subset of approved sharing applications 723. In some cases, the metadata may include links to download one or more approved sharing applications 723 (e.g., in case the approved sharing applications 723 are not installed on the client device 720).

At step 807, the virtual environment 711 of the virtualization server 710 may send the shared content and/or metadata to the client device 720. For example, the virtual environment 711 may cause the virtualization server 710 to transmit a URI and metadata in a signaling channel of the established session, and the client device 720 may then access the URI and download the shared content into a storage area of the client device 720. Additionally or alternatively, the virtual environment 711 may cause the virtualization server 710 to place the shared content into a virtual content drive hosted by the virtualization server 710 that is accessible from the client device 720. For example, if the virtualization server 710 provides a content drive mapping service in conjunction with the client virtualization agent 722, the virtual environment 711 may cause the virtualization server 710 to send the content to be shared to the client device 720 by placing the content in a mapped virtual content drive. In any case, the shared content may be stored in a location that is accessible (e.g., using a URI) to the operating system 721 and/or the client virtualization agent 722 of the client device 720. As an alternative to sending a URI, the virtual environment 711 of the virtualization server 710 may instead simply send the shared content directly to the client device 720 (i.e., pushing the content to the client device 720).

At step 808, the client device 720 may invoke a share action provided by the client device 720. The share action may be invoked by the client virtualization agent 722 based on a particular client sharing functionality provided by an operating system 721 of the client device 720. For example, if the client device 720 is an ANDROID device, the client virtualization agent 722 may generate a sharing action using an ANDROID Intent. In this example, the client virtualization agent 722 may create an Intent object and set an action element of the Intent object to a relevant action, such as an "Intent.ACTION_SEND" action that indicates that content should be shared via another application. The client virtualization agent 722 may include additional data in the Intent object, such as any text to be shared and/or a uniform resource identifier (URI) referencing other content to be shared (e.g., a URI pointing to the shared content received at step 807). As part of invoking the share action, the client virtualization agent 722 may generate the URI and embed it in the Intent object.

Similarly, if the client device 720 is an IOS device, the client virtualization agent 722 may invoke share extensions or other sharing functionality provided by IOS. As with the ANDROID intent as disclosed above, this may involve setting an action (e.g., a share action) and including a URI that links to the content to be shared, but may use IOS frameworks and/or protocols. Similarly, if the client device 720 is a WINDOWS device, or some other type of device, the client virtualization agent 722 may use the sharing functionality provided by the operating system 721 or any other device functionality to invoke a share action.

At step 809, the client virtualization agent 722 of the client device 720 may determine the sharing applications 723 and/or other sharing mechanisms 724 installed or and/or otherwise available at the client device 720. For example, the client virtualization agent 722 may access a function that provides a list of the sharing applications 723 and/or other sharing mechanisms 724 installed or and/or otherwise available at the client device 720. The client virtualization agent 722 may use a built-in function provided by the operating system 721 and/or may use its own logic to discover the list of sharing mechanisms present on the device. For example, the client virtualization agent 722 may call a function for listing applications and other mechanisms associated with a "share" action, and the operating system 721 may return a list of the sharing applications 723 and/or other sharing mechanisms 724 that are available on the device. The sharing applications 723 may include, for example, one or more chat application(s), email application(s), other messaging application(s), social media application(s), photo sharing application(s), video sharing application(s), cloud storage application(s), note taking application(s), bookmarking application(s), and the like. The other sharing mechanisms 724 may include a mechanism for sharing content with another local device via BLUETOOTH, a mechanism for sharing content with another device via WIFI, a mechanism for storing content on a cloud sharing service, a mechanism for bookmarking content for later viewing, and/or the like, which may be provided as built-in functionality of the operating system 721 or otherwise.

In some cases, the client virtualization agent 722 may determine that no appropriate sharing applications 723 and/or other sharing mechanisms 724 exist on the client device 720. For example, the client virtualization agent 722 may determine that none of the limited subset of permitted sharing applications 723 are installed on the client device 720. In such a situation, the client virtualization agent 722 may display links (e.g., to an application store) for downloading one or more appropriate sharing applications 723 and allow a user to install one or more of the sharing applications 723 before proceeding to the next step of process. For example, the client virtualization agent 722 may display any links that were included in the metadata received at step 807. Additionally or alternatively, the client virtualization agent 722 may display a message indicating that no appropriate sharing applications 723 and/or other sharing mechanisms 724 exist, and instructing the user to install one or more sharing applications 723.

At step 810, the client device 720 may display the list of sharing mechanisms for the user. For example, the client virtualization agent 722 may cause the operating system 721 to display an overlay listing the various sharing applications 723 and/or other sharing mechanisms 724 installed or and/or otherwise available at the client device 720 on a scrollable list inside an overlay displayed on the client device 720. Additionally or alternatively, the client virtualization agent 722 itself may display a list of various sharing applications 723 and/or other sharing mechanisms 724 installed or and/or otherwise available at the client device 720 (e.g., within the content being displayed by the client virtualization agent 722). For example, the client virtualization agent 722 may display a list including several messaging applications, a social media application, a video sharing application, and a BLUETOOTH sharing mechanism. The list may be configured so that a user can select one or more of the items on the list in order to share the content via the one or more selected sharing applications 723 and/or other sharing mechanisms 724. In some cases (e.g., when the security layer 706 limits the sharing applications 723 that may be used), the client virtualization agent 722 may first filter the sharing applications 723 and/or other sharing mechanisms 724 that may be displayed (e.g., to only approved ones).

At step 811, a user of the client device 720 may input a selection of one of the sharing applications 723 and/or other sharing mechanisms 724 by selecting an option from the list of sharing mechanisms displayed on the client device 720. For example, the user may select a chat application on the list to share the content via the selected chat application. In some cases, the user may select multiple sharing applications 723 and/or other sharing mechanisms 724 to share the content multiple times via different applications. The client device 720 may thus receive a selection of one or more of the sharing mechanisms from the user.

In some cases, the client device 720 may automatically select a sharing application 723 and/or other sharing mechanism at step 812 without receiving user input. For example, if the content to-be-shared is associated with only a single sharing application 723 and/or other sharing mechanism 724, and/or if the particular content is associated with a preferred sharing application 723 and/or other sharing mechanism 724, then the client device 720 may automatically select a particular sharing application 723 and/or other sharing mechanism 724. As a specific example, a user may prefer to share videos via a particular video sharing application. Thus, when the content received at step 806 is a video, the client device 720 may know to automatically select the video sharing application for sharing the video. Such user preferences may be stored by the operating system 721 and/or by the client virtualization agent 722.

At step 812, the client device 720 may generate a share action including data to send to the receiver device(s) 730. For example, after a user selects a particular sharing application 723 in step 812, the selected sharing application 723 may generate a message for sharing with receiver device(s) 730 associated with a contact stored by the sharing application 723. For example, if the selected sharing mechanism is a chat application, the chat application may access the shared content and/or a URI pointing to the shared content, format the content as required (e.g., enclose the content in a chat message), and allow the user to select who will receive the shared content (e.g., an individual or group). In general, the various sharing mechanisms may share the content in various ways according to the functionality of each application, such as by providing an email message, providing a text message, chat message, social media post, or the like.

In some cases, the selected sharing application(s) 723 and/or other sharing mechanisms 724 may require the user of the client device 720 to input one or more contact(s) (e.g., friends or colleagues) to share the content with. For example, chat applications may allow the user of the client device 720 to share the content with a user or group of users, and thus the user must select who to share the content with before the content may be shared. In other cases, no such selection may be required by the sharing application(s) 723 and/or other sharing mechanisms 724. For example, if the user wishes to post the content via a social media application, there may be no need to select which users will receive the content.

At step 813, the client device 720 may share the content by sending it to the receiver device(s) 730. The selected sharing application 723 and/or other sharing mechanism 724 may cause the client device 720 to transmit a message containing the shared content and/or a link to the shared content directly or indirectly to receiver device(s) 730 corresponding to the sharing application 723 and/or other sharing mechanism 724. For example, the selected sharing application 723 and/or other sharing mechanism 724 may send a message to devices associated with a particular user and/or may post the content on a web server (e.g., a social media web server) to cause the sharing.

At step 814, the client device 720 may delete the shared content if it was downloaded to the client device 720 at step 806. For example, after the share message is sent in step 814, the client device 720 may automatically proceed to delete the shared content in step 815. Alternatively, the client device 720 may wait a predetermined period of time before deleting the shared content (e.g., in case the user sends another share message sharing the same content to another receiver device 730). Additionally or alternatively, the time period for storing the content may have been set by the virtualization server 710 (e.g., by the security layer 716, which may have set a maximum time period for storing content as discussed above). For example, the security layer 716 may have determined an amount of time that the shared content may remain stored on the client device 720 as part of step 805, and caused the specified amount of time to be transmitted to the client device 720 along with the download of the shared content at step 806 and/or as part of the share command sent at step 808. The security layer 716 may determine the amount of time the content may remain stored at the client device 720 based on permissions associated with the shared content and/or based on policy rules as specified above. When the maximum time period as specified by the virtualization server 710 and/or the predetermined time period elapses, the client device 720 may then delete the content.

If the user later requests to share the same content again, the process may repeat from step 804. However, when the content is still stored at the client device 720, in some cases the client device 720 may not have to re-download the content at step 807. Instead, if the virtual environment 711 of the virtualization server 710 determines that the content is still stored at the client device 720 (e.g., because a length of time for storing the content has not elapsed), then at step 807 the virtual environment 711 of the virtualization server

710 may send a command instructing the client device 720 to use the locally stored copy of the content. Additionally or alternatively, when the content has already been deleted, the client device 720 may need to again download the content at step 807.

At step 815, the virtualization agent 722 of the client device 720 may log the sharing action with the security layer 716 of the virtualization server 710. For example, the virtualization agent 722 of the client device 720 may send, to the security layer 716 of the virtualization server 710, data indicating when the data was shared, what sharing application(s) 723 and/or other sharing mechanism(s) 724 were used to share the content, which contacts of the user the content was shared with, and/or other such data.

At step 816, the security layer 716 of the virtualization server 710 may generate analytics and/or a security report about one or more logged sharing actions (e.g., including the share action logged at step 815). For example, the analytics may indicate how often corporate data is being shared, whether corporate data is frequently shared outside an organization, what types of data are being shared most frequently, and other such data that is compiled based on the share action logged at step 815 and/or other logged share actions.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
   a client device; and
   a virtualization server hosting a virtual environment comprising a virtual desktop and a security layer limiting sharing of content from within the virtual environment to outside the virtual environment, wherein the virtualization server is configured to perform steps comprising:
      receiving, from the client device, via an established session with the virtual desktop, a request to share content that exists within the virtual desktop outside the virtual environment; and
      sending the content and a command to share the content outside the virtual environment to the client device;
   wherein the client device is configured to perform steps comprising:
      transmitting, to the virtualization server, the request to share the content that exists within the virtual desktop outside the virtual environment;
      receiving the content and the command to share the content from the virtualization server;
      responsive to the received command, invoking a share action provided by the client device, wherein invoking the share action comprises creating a data object comprising a uniform resource identifier (URI) pointing to the content;
      passing the data object to an operating system of the client device;
      determining, based on the received data object, one or more applications installed on the client device that are capable of sharing the content;
      transmitting an indication of the one or more applications to a user;
      receiving a user selection of a first application of the one or more applications; and in response to receiving the user selection, the first
application performing steps comprising:
accessing the content using the data object;
receiving a user selection of a second user associated
with a user device; and
sending the content to the user device.

2. The system of claim 1, wherein the virtualization server
is further configured to perform steps comprising:
determining, by the security layer of the virtual environ-
ment, based on one or more of permissions associated
with the content or rules specifying policies for sharing
content, to grant the request to share the content,
wherein the sending of the content to the client device is
responsive to the determining to grant the request to
share the content.

3. The system of claim 2, wherein the determining to grant
the request to share the content is based on the rules
specifying policies for sharing content, wherein the rules
comprise one or more of:
a first rule specifying types of content that may be shared;
a second rule specifying permissions for content that may
be shared;
or a third rule specifying metadata for content that may be
shared.

4. The system of claim 1, wherein the virtualization server
is further configured to perform steps comprising:
determining whether to permit temporary storage of the
content on the client device; and
sending, to the client device, an instruction indicating
whether temporary storage is permitted.

5. The system of claim 1, wherein the receiving of the
content further comprises receiving an instruction indicating
a maximum time period for storing the content, wherein the
client device is further configured to perform steps compris-
ing:
storing the content;
prior to the maximum time period elapsing, sharing the
stored content with a second user device associated
with a third user; and
responsive to the maximum time period elapsing, deleting
the content from storage.

6. The system of claim 5, wherein the client device is
further configured to perform steps comprising:
after the deleting of the content, receiving, from a first
user, a request to share the content; and
responsive to the request from the first user, sending a
second request to share the content to the virtualization
server.

7. The system of claim 1, wherein the virtualization server
is further configured to perform steps comprising:
receiving, from the client device, a message indicating
that the content was shared with another device; and
generating, based on the message, analytics indicating one
or more of a type of the content, the application that
was used to share the content, or information about a
user that received the content.

8. A method comprising:
generating, by one or more processors of a virtualization
server, a virtual environment comprising a virtual desk-
top and a security layer limiting sharing of content from
within the virtual environment to outside the virtual
environment;
establishing, by the one or more processors, a session with
a client device, wherein the session allows the client
device to interact with the virtual desktop;

receiving, from the client device, via the established
session, a request to share content that exists within the
virtual desktop outside the virtual environment;
sending the content and a command to share the content
outside the virtual environment to the client device;
sending, to the client device, a command configured to
cause the client device to determine one or more
applications installed on the client device and allow a
user of the client device to select an application of the
one or more applications in order to share the content
outside the virtual environment via the selected appli-
cation;
wherein the client device performs steps comprising:
transmitting, to the virtualization server, the request to
share the content that exists within the virtual desk-
top outside the virtual environment;
receiving the content and the command to share the
content from the virtualization server;
responsive to the received command, invoking a share
action provided by the client device, wherein invok-
ing the share action comprises creating a data object
comprising a uniform resource identifier (URI)
pointing to the content;
passing the data object to an operating system of the
client device;
determining, based on the received data object, one or
more applications installed on the client device that
are capable of sharing the content;
transmitting an indication of the one or more applica-
tions to a user;
receiving a user selection of a first application of the
one or more applications;
in response to receiving the user selection, the first
application performing steps comprising:
accessing the content using the data object;
receiving a user selection of a second user associated
with a user device; and
sending the content to the user device.

9. The method of claim 8, further comprising:
determining, by the security layer of the virtual environ-
ment, based on one or more of permissions associated
with the content or rules specifying policies for sharing
content, to grant the request to share the content,
wherein the sending of the content to the client device
is responsive to the determining to grant the request to
share the content.

10. The method of claim 9, wherein the determining to
grant the request to share the content is based on the rules
specifying policies for sharing content, wherein the rules
comprise one or more of:
a first rule specifying types of content that may be shared;
a second rule specifying permissions for content that may
be shared; or
a third rule specifying metadata for content that may be
shared.

11. The method of claim 8, further comprising:
determining, by the one or more processors, whether to
permit temporary storage of the content on the client
device; and
sending, to the client device, an instruction indicating
whether temporary storage is permitted.

12. The method of claim 8, further comprising:
receiving, from the client device, a message indicating
that the content was shared with another device; and
generating, based on the message, analytics indicating one
or more of a type of the content, the application that was used to share the content, or information about a user that received the content.

13. A method comprising:

establishing, by one or more processors of a client device, a session with a virtualization server, wherein the session allows the client device to interact with a virtual desktop within a virtual environment comprising a security layer limiting sharing of content from within the virtual environment to outside the virtual environment;

receiving, via a user interface of the client device, input from a user of the client device, the input comprising a request to share content that exists within the virtual desktop outside the virtual environment;

responsive to the transmitted input, receiving, via the established session, content and a command to share the content that exists within the virtual desktop, the content being received outside the virtual desktop;

determining, by the one or more processors, one or more applications capable of sharing content with another device, wherein each of the one or more applications are installed on the client device;

wherein the client device perform steps of:

transmitting, to the virtualization server, the request to share the content that exists within the virtual desktop outside the virtual environment;

receiving the content and the command to share the content from the virtualization server;

responsive to the received command, invoking a share action provided by the client device, wherein invoking the share action comprises creating a data object comprising a uniform resource identifier (URI) pointing to the content;

passing the data object to an operating system of the client device;

determining, based on the received data object, one or more applications installed on the client device that are capable of sharing the content;

transmitting an indication of the one or more applications to a user;

receiving a user selection of a first application of the one or more applications;

in response to receiving the user selection, the first application performing steps comprising:

accessing the content using the data object;

receiving a user selection of a second user associated with a user device; and sending the content to the user device.

14. The method of claim 13, wherein the first application is a messaging application, wherein the sending of the content to the user device comprises sending a message to the user device.

15. The method of claim 13, wherein the first application is a social media application, wherein the sending of the content to the user device comprises making the content accessible to the user device via the social media application.

16. The method of claim 13, wherein the receiving of the content further comprises receiving an instruction indicating a maximum time period for storing the content, wherein the method further comprises:

storing the content;

prior to the maximum time period elapsing, sharing the stored content with a second user device associated with a third user; and responsive to the maximum time period elapsing, deleting the content from storage.

17. The system of claim 1, wherein sending the content outside the virtual environment to the client device comprises transmitting a uniform resource identifier (URI) and metadata in a signaling channel of an established session of the virtual desktop to the client device.

18. The method of claim 8, wherein sending the content outside the virtual environment to the client device comprises transmitting a uniform resource identifier (URI) and metadata in a signaling channel of an established session of the virtual desktop to the client device.

* * * * *